United States Patent
Scollard

[11] Patent Number: 5,461,992
[45] Date of Patent: Oct. 31, 1995

[54] DEEP ROOT TREE AND SHRUB FERTILIZER STAKE DRIVERS

[76] Inventor: Robert A. Scollard, 3306 Duck Creek Rd., Billings, Mont. 59107

[21] Appl. No.: 149,517

[22] Filed: Nov. 9, 1993

[51] Int. Cl.⁶ .................................................... A01C 5/02
[52] U.S. Cl. ................... 111/7.2; 111/96; 111/98; 47/48.5; 173/30
[58] Field of Search .................. 111/7.1, 7.2, 92, 111/95, 96, 98; 173/30, 91; 47/48.5; 30/277

[56] References Cited

U.S. PATENT DOCUMENTS

| | | | |
|---|---|---|---|
| 434,814 | 8/1890 | Tuck | 111/7.1 |
| 591,216 | 10/1897 | Griffin | 111/98 X |
| 1,965,177 | 7/1934 | Finkl | 111/92 X |
| 1,979,541 | 11/1934 | Gunn | 111/7.1 |
| 2,020,571 | 11/1935 | Pick | 111/92 X |
| 2,065,678 | 12/1936 | Fish, Jr. | 111/7.1 X |
| 2,243,510 | 5/1941 | Smith | 111/96 |
| 2,370,744 | 3/1945 | Molinare | 111/96 |
| 2,747,528 | 5/1956 | Hunkins | 111/92 |
| 2,987,018 | 6/1961 | Vath | 111/95 X |
| 3,202,120 | 8/1965 | Laffler | 111/96 |
| 3,516,171 | 6/1970 | Martin . | |
| 3,543,868 | 12/1970 | Drake | 173/21 |
| 3,753,408 | 8/1973 | Zimmerman | 111/7.1 |
| 4,101,088 | 7/1978 | Stauth | 242/85 |
| 4,246,854 | 1/1981 | Lempa, Jr. | 111/96 |
| 4,813,494 | 3/1989 | Beard et al. | 173/91 |
| 4,934,288 | 6/1990 | Kusiak et al. | 111/7.1 X |
| 4,976,483 | 12/1990 | Cunningham | 254/29 R |
| 5,170,729 | 12/1992 | Benner | 111/92 X |

FOREIGN PATENT DOCUMENTS

| | | | |
|---|---|---|---|
| 798638 | 11/1968 | Canada | 111/7.1 |
| 1217279 | 3/1986 | U.S.S.R. | 111/96 |

Primary Examiner—Randolph A. Reese
Assistant Examiner—Christopher J. Novosad

[57] ABSTRACT

A deep root tree and shrub fertilizer stake driver comprising an elongated tube having a hollow circular configuration and having an upper end and a lower end, a plurality of axial slots formed in the tube extending upwardly from the lower end thereof and a rigid rod having an upper end and a lower end slidably positionable within the tube of a slightly longer length as the tube.

2 Claims, 4 Drawing Sheets

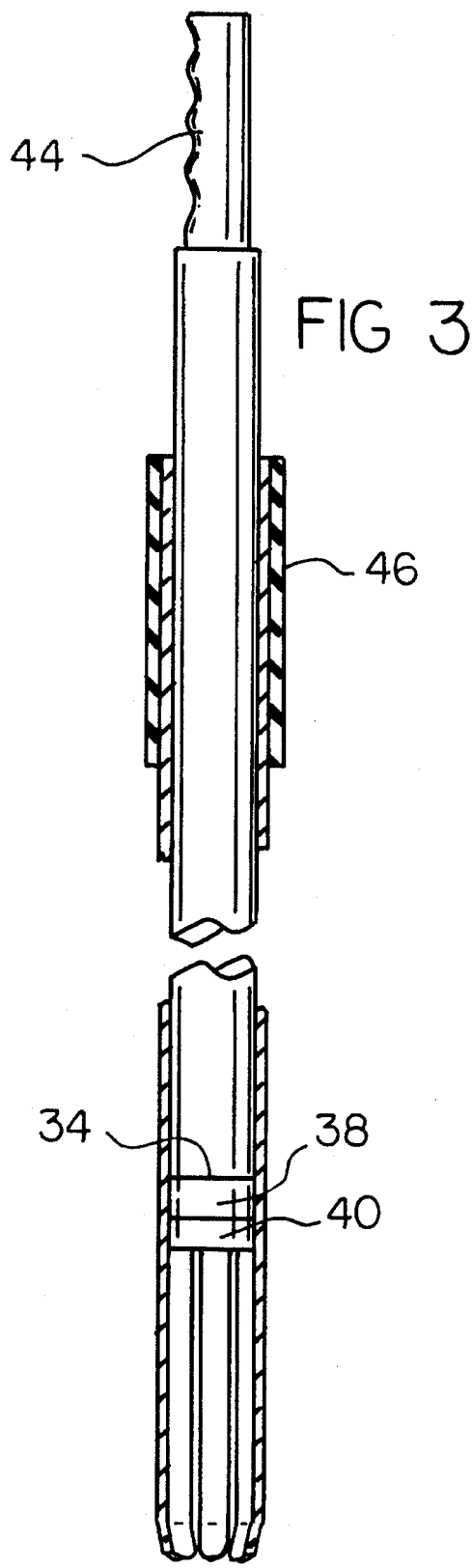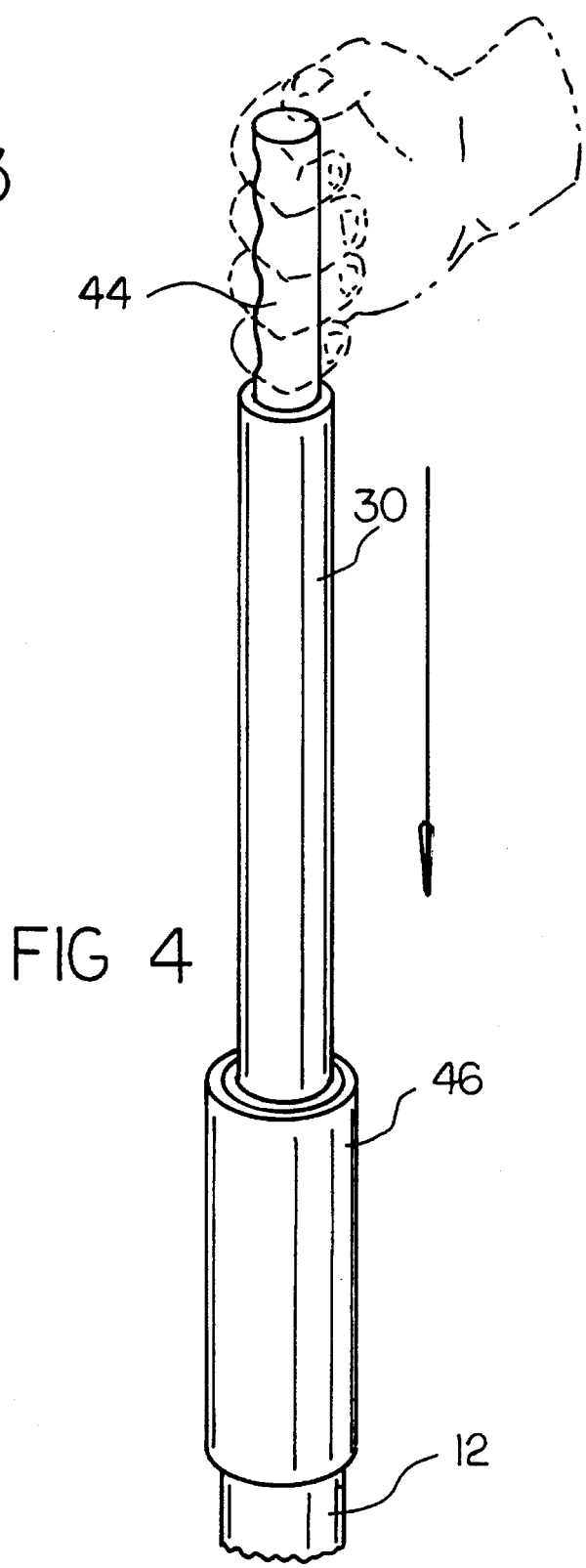

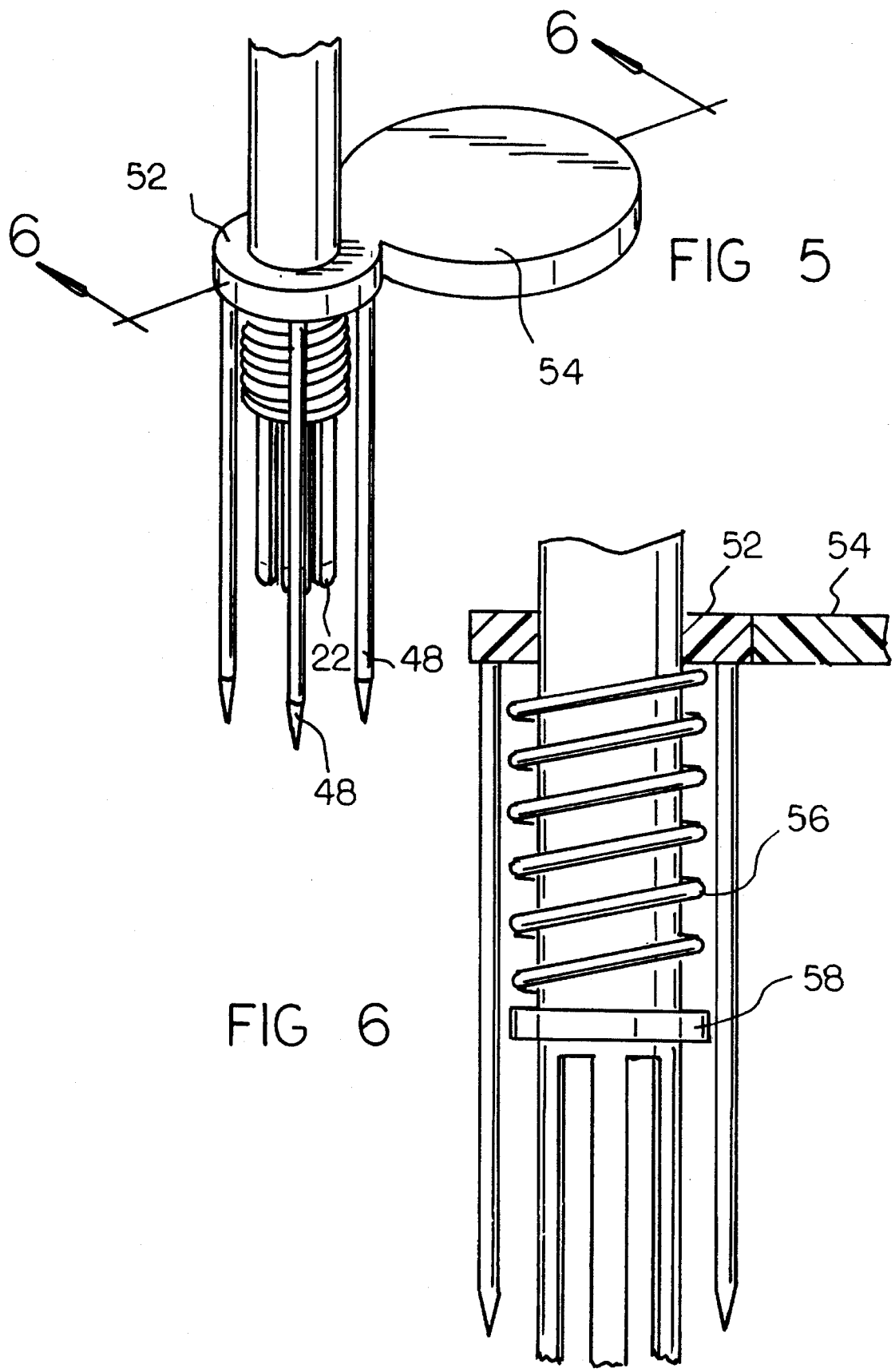

5,461,992

DEEP ROOT TREE AND SHRUB FERTILIZER STAKE DRIVERS

BACKGROUND OF THE INVENTION

1. Field of the Invention

The present invention relates to deep root tree and shrub fertilizer stake drivers and more particularly pertains to the driving of fertilizer stakes into the ground more efficiently and conveniently.

2. Description of the Prior Art

The use of stake drivers is known in the prior art. More specifically, stake drivers heretofore devised and utilized for the purpose of driving stakes are known to consist basically of familiar, expected, and obvious structural configurations, notwithstanding the myriad of designs encompassed by the crowded prior art which has been developed for the fulfillment of countless objectives and requirements.

The prior art discloses a large number of devices for driving stakes of one type or another. By way of example, U.S. Pat. Nos. 4,813,494 to Beard; 4,976483 to Cunningham and 4,101,088 to Stauth disclose manual mechanisms for driving stakes of various types.

U.S. Pat. Nos. 3,516,171 to Martin and 3,543,868 to Drake disclose powered systems for driving stakes.

In this respect, the deep root tree and shrub fertilizer stake driver according to the present invention substantially departs from the conventional concepts and designs of the prior art, and in doing so provides an apparatus primarily developed for the purpose of the driving of fertilizer stakes into the ground more efficiently and conveniently.

Therefore, it can be appreciated that there exists a continuing need for new and improved deep root tree and shrub fertilizer stake drivers which can be used for the driving of fertilizer stakes into the ground more efficiently and conveniently. In this regard, the present invention substantially fulfills this need.

SUMMARY OF THE INVENTION

In view of the foregoing disadvantages inherent in the known types of stake drivers now present in the prior art, the present invention provides an improved deep root tree and shrub fertilizer stake driver. As such, the general purpose of the present invention, which will be described subsequently in greater detail, is to provide a new and improved deep root tree and shrub fertilizer stake driver and method which has all the advantages of the prior art and none of the disadvantages.

To attain this, the present invention essentially comprises a new and improved deep root tree and shrub fertilizer stake driver comprising, in combination an elongated tube having a hollow circular configuration and having an upper end and a lower end, a plurality of axial slots formed in the tube extending upwardly from the lower end and terminating in inturned fingers, a rigid rod having an upper end and a lower end slidably positionable within the tube of a slightly longer length as the tube, the rod having a striker pad at the lower end thereof and a rubber pad secured to the striker pad, a grip formed around the periphery of the tube at the upper end of the tube, a handle formed around the periphery of the rod at the upper end of the rod, a plurality of spikes coupled with respect to the tube adjacent to the lower end of the tube and extendable to a distance beyond the lower end of the tube and with a foot pedal secured thereto to drive the spikes into the ground, a spring having an upper end coupled with respect to the lower face of the pedal and a lower end coupled with respect to the lower end of the tube, and a dispenser for fluid secured to the tube adjacent to its lower end.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved deep root tree and shrub fertilizer stake drivers which have all the advantages of the prior art stake drivers and none of the disadvantages.

It is another object of the present invention to provide new and improved deep root tree and shrub fertilizer stake drivers which may be easily and efficiently manufactured and marketed.

It is a further object of the present invention to provide new and improved deep root tree and shrub fertilizer stake drivers which are of durable and reliable constructions.

An even further object of the present invention is to provide new and improved deep root tree and shrub fertilizer stake drivers which are susceptible of a low cost of manufacture with regard to both materials and labor, and which accordingly are then susceptible of low prices of sale to the consuming public, thereby making such deep root tree and shrub fertilizer stake drivers economically available to the buying public.

Still yet another object of the present invention is to provide new and improved deep root tree and shrub fertilizer stake drivers which provide in the apparatuses and methods of the prior art some of the advantages thereof, while simultaneously overcoming some of the disadvantages normally associated therewith.

Even still another object of the present invention is to drive fertilizer stakes into the ground more efficiently and conveniently.

Lastly, it is an object of the present invention to provide a new and improved deep root tree and shrub fertilizer stake driver comprising an elongated tube having a hollow circular configuration and having an upper end and a lower end, a plurality of axial slots formed in the tube extending upwardly from the lower end thereof and a rigid rod having an upper end and a lower end slidably positionable within the tube of a slightly longer length as the tube.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a sectional view of the device of the prior Figures taken along line 3—3 of FIG. 1.

FIG. 4 is a perspective view of the upper portion of the device constructed in accordance with the principles of the present invention.

FIG. 5 is a perspective view of a device but constructed in accordance with an alternate embodiment of the invention.

FIG. 6 is a sectional view of the device of FIG. 5 along line 6—6 of FIG. 5.

The same reference numerals refer to the same parts throughout the various Figures.

DESCRIPTION OF THE PREFERRED EMBODIMENT

Figure 1:
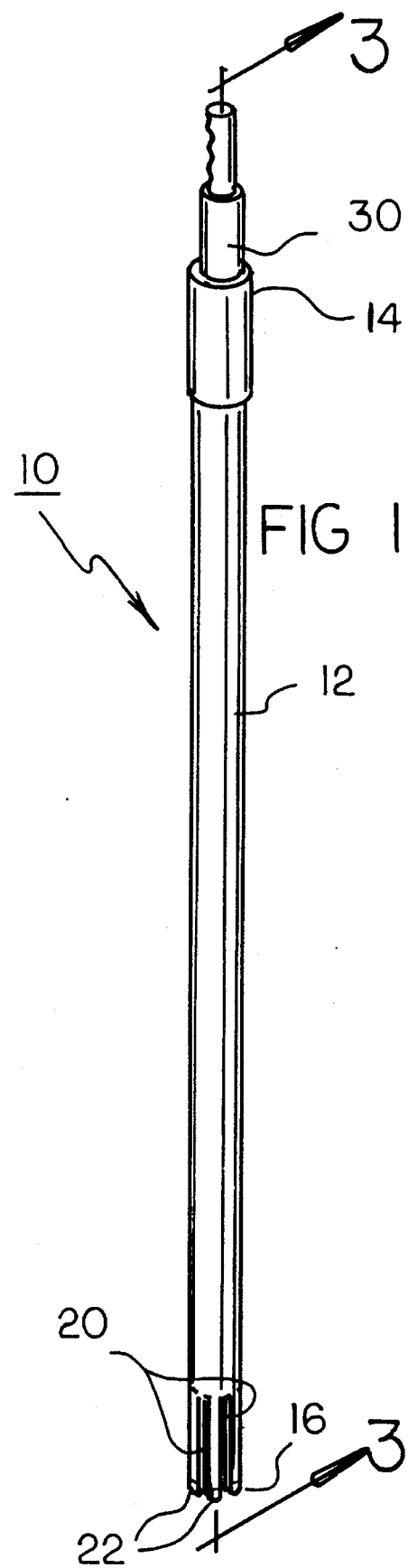
FIG. 1 is a perspective view of the device for driving stakes constructed in accordance with the principles of the present invention.
Figure 2:
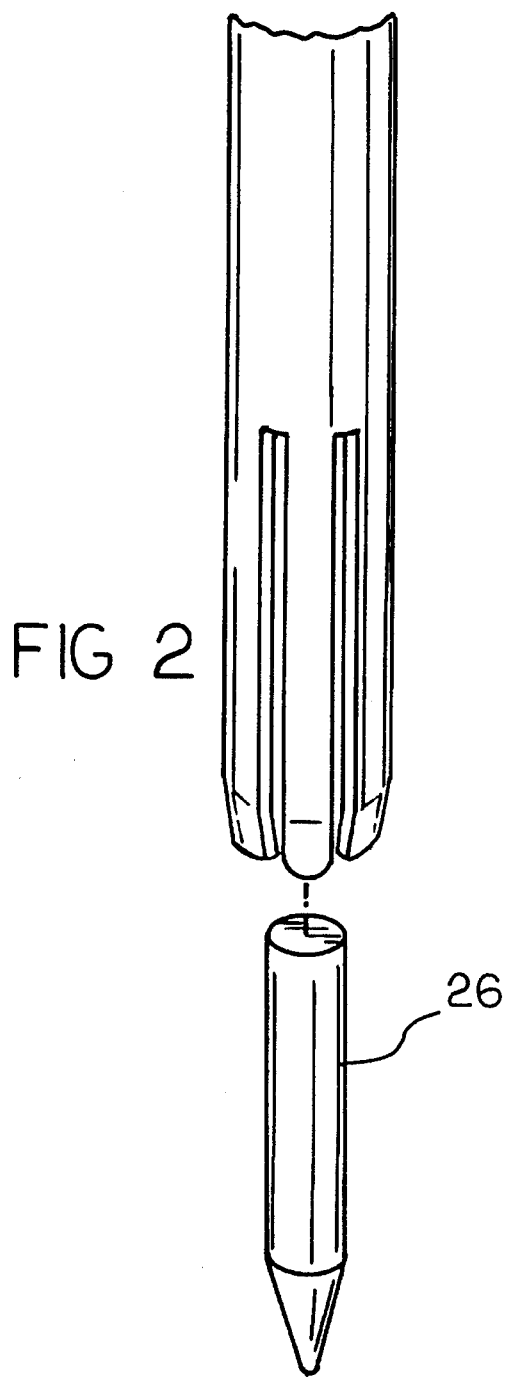
FIG. 2 is a perspective view of the lower portion of the device of FIG. 1.

With reference now to the drawings, and in particular to FIGS. 1 through 4 thereof, the preferred embodiment of the new and improved deep root tree and shrub fertilizer stake drivers embodying the principles and concepts of the present invention and generally designated by the reference numeral 10 will be described.

More specifically, as can be seen in FIGS. 1 through 4, the present invention is a stake driver 10 which includes an elongated tube 12 formed with a hollow circular cross-sectional configuration. It has an upper end 14 and a lower end 16.

The lower end 16 is formed with plurality of axial slots 20. The slots extend upwardly from the lower end 16 of the tube 12. The lower end thus forms axial fingers 22 which are inturned at their lower ends to preclude inadvertent passage of fertilizer spikes 26 therebeyond as will be explained hereinafter.

Positioned interior of the tube 12 is a rigid rod 30. The rod has a solid cross-section in the form of a circle. It also has an upper end 32 and a lower end 34. It is of a length slightly longer than that of the tube 12. At its lower end, the rod has secured thereto a striker pad 38 and a rubber pad 40 secured to the lower end of the striker pad.

For the convenience of the user, a handle 44 is provided at the upper end of the rod. In addition, a grip 46 is formed around the periphery of the tube 12 adjacent to its upper end. Handling of the components of the system is thus facilitated during operation and use.

In an alternate embodiment of the invention, as shown in FIGS. 5 and 6, a plurality of rigid, downwardly pointed spikes 48 are employed. The spikes 48 have their upper ends secured to a generally circular plate 52 slidably secured to the tube 12 so as to terminate slightly above the lower ends of the fingers 22. The spikes are adapted to move vertically so as to extend a slight distance beyond the lower end of the fingers for securement into the ground. A foot pedal 54 is formed integrally with the plate 52. In this manner, a user may tramp down on the pedal to drive the spikes into the ground during operation and use. A spring 56 is located between the plate 52 and a collar 58. The collar 58 is secured to the tube 12 above the spikes. This arrangement allows a user to step on the pedal 54 and drive the spikes downwardly beyond the ends of the fingers into the ground during operation and use.

Figure 7:
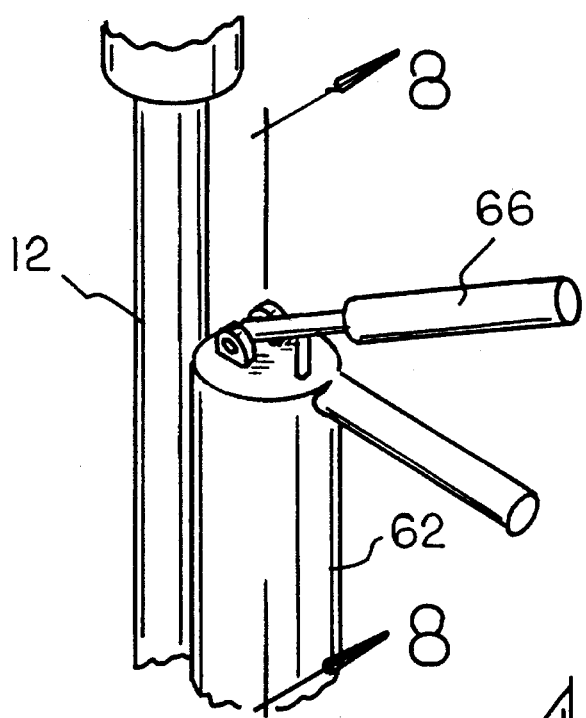
FIG. 7 is a perspective view of a device constructed in accordance with another alternate embodiment of the invention.
Figure 8:
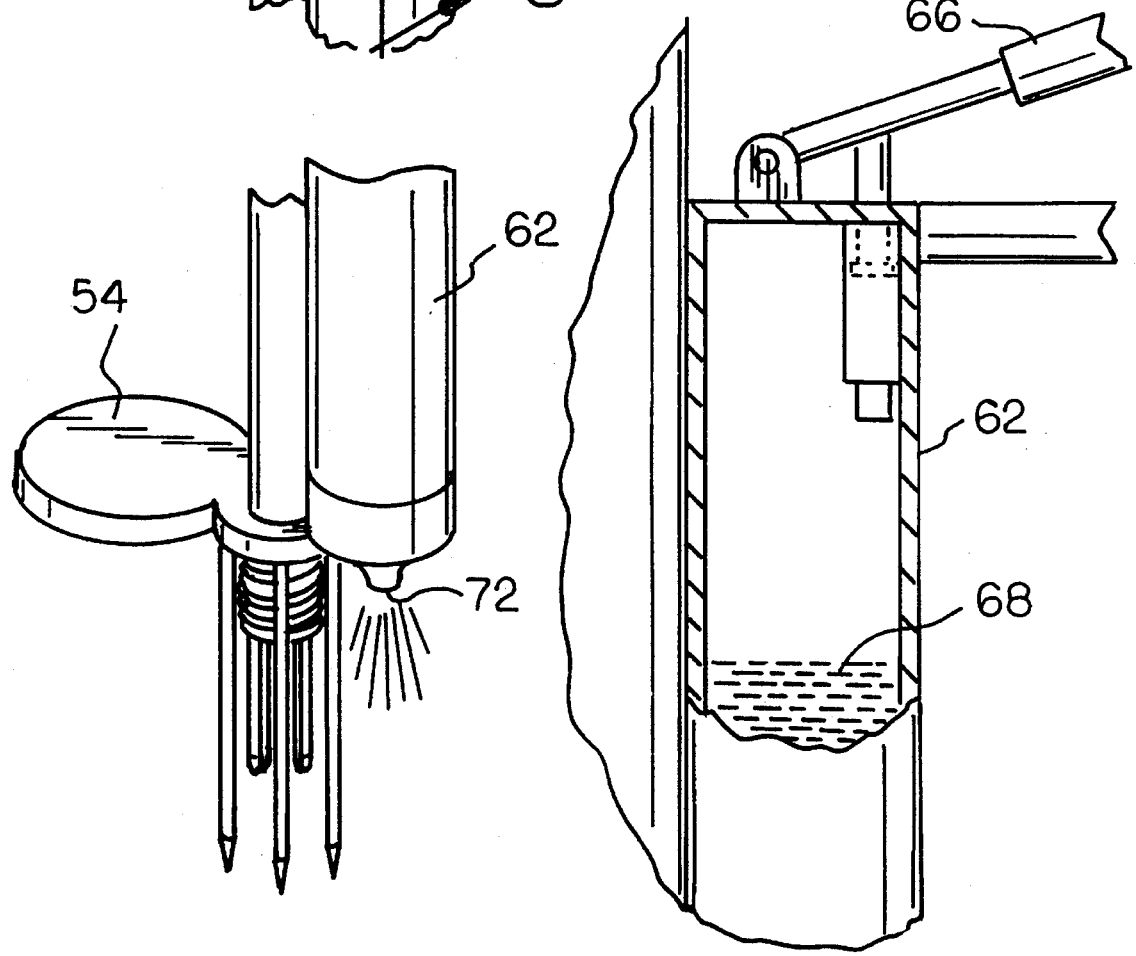
FIG. 8 is a sectional view of the device of FIG. 7 taken along line 8—8 of FIG. 7.

The last embodiment of the invention is shown in FIGS. 7 and 8. Such embodiment includes a liquid dispenser 62. Such dispenser is coupled to the lower end of the tube 12 on the side thereof opposite from the pedal 54. A dispensing handle is coupled to the upper end of the container for urging fluid 68 downwardly through a downwardly facing orifice 72 for dispensing fluids to the area beneath the apparatus. Such fluids may be a fertilizer. Such fluid may also be a marker to indicate where such fertilizer spike has been injected into the ground.

The present invention is an innovative device that provides fertilizer to the roots of trees and bushes. Fertilizing deep-rooted plants can be difficult since chemicals placed on top of the soil take a long time to reach the roots. This device provides the means to inject nutrients directly into the soil, near the roots, to provide the plant with an immediate source of nutrients. It does this without the need for the gardener to get down on his or her hands and knees, or to bend all the way over.

This invention consists of a 40 inches long, 1⅝ inches diameter rod that contains the striker assembly. A foam pad encircles the top of the rod to serve as a hand grip. The striker is essentially a weighted rod with a bicycle-style hand grip attached to the top. The striker plate is located at the bottom and is designed to make contact with a rubber pad located on top of a fertilizer stake, which is held in place inside of the main tube with a set of plastic fingers.

To drive a fertilizer stake into the ground, the user simply pushes the stake into the bottom of the present invention until it is held by the plastic fingers. The unit is then placed in the desired location and the plunger lifted upward. With a small degree of force the striker is brought down to impact on the top of the stake. This action produces the thrust required to drive the stake into the ground.

The present invention is simple to use and is ideal for the elderly or handicapped, as well as the rest of the general public. It will help plants to be more healthy and grow more quickly, with less effort on the part of the user. The present invention is simple in design and construction and may be made from readily available materials.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved deep root tree and shrub fertilizer stake driver comprising, in combination:

an elongated tube having a hollow cylindrical configuration and having an upper end and a lower end;

a plurality of axial slots formed in the tube extending upwardly from the lower end and terminating in inturned fingers;

a rigid rod having an upper end and a lower end slidably positionable within the tube of a slightly longer length as the tube, the rod having a striker pad at the lower end thereof and a rubber pad secured to the striker pad;

a grip formed around the periphery of the tube at the upper end of the tube;

a handle formed around the periphery of the rod at the upper end of the rod;

a plurality of spikes coupled with respect to the tube adjacent to the lower end of the tube and extendable to a distance beyond the lower end of the tube and with a foot pedal secured to the tube to drive the spikes into the ground;

a spring having an upper end coupled with respect to a lower face of the pedal and a lower end coupled with respect to the lower end of the tube;

and a dispenser for fluid secured to the tube adjacent to its lower end.

2. A deep root tree and shrub fertilizer stake driver comprising:

an elongated tube having a hollow cylindrical configuration and having an upper end and a lower end;

a plurality of axial slots formed in the tube extending upwardly from the lower end thereof;

a rigid rod having an upper end and a lower end slidably positionable within the tube of a slightly longer length as the tube;

a plurality of spikes coupled with respect to the tube adjacent to the lower end of the tube and extendable to a distance beyond the lower end of the tube and with a foot pedal secured to the tube to drive the spikes into the ground; and a spring having an upper end coupled to the pedal along a lower surface of the pedal and a lower end coupled to the lower end of the tube.

* * * * *